US007221873B1

(12) United States Patent
Bock et al.

(10) Patent No.: US 7,221,873 B1
(45) Date of Patent: May 22, 2007

(54) NETWORK NODES WITH OPTICAL ADD/DROP MODULES

(76) Inventors: Harald Bock, Hinterer Lech 36, 86150 Augsburg (DE); Patrick Leisching, Fasanenstr 18, 81247 Muenchen (DE); Detlef Stoll, 6503 N. Military Trail, #4100, Boca Raton, FL (US) 33496

( * ) Notice: Subject to any disclaimer, the term of this patent is extended or adjusted under 35 U.S.C. 154(b) by 0 days.

(21) Appl. No.: 09/913,987

(22) PCT Filed: Feb. 8, 2000

(86) PCT No.: PCT/DE00/00371

§ 371 (c)(1), (2), (4) Date: Aug. 20, 2001

(87) PCT Pub. No.: WO00/49751

PCT Pub. Date: Aug. 24, 2000

(30) Foreign Application Priority Data

Feb. 18, 1999 (DE) ................ 199 06 862

(51) Int. Cl.
*H04B 10/00* (2006.01)
(52) U.S. Cl. .......................... 398/84; 398/83
(58) Field of Classification Search ............ 398/83–87, 398/3–7
See application file for complete search history.

(56) References Cited

U.S. PATENT DOCUMENTS

| 5,748,349 A | 5/1998 | Mizrahi |
| 5,953,141 A * | 9/1999 | Liu et al. .................. 398/83 |
| 6,249,510 B1 * | 6/2001 | Thompson ............... 370/223 |
| 6,266,168 B1 * | 7/2001 | Denkin et al. ............. 398/5 |

FOREIGN PATENT DOCUMENTS

| DE | 19731494 | 2/1999 |
| EP | 0729247 | 8/1996 |
| EP | 0847158 | 6/1998 |
| EP | 0892524 | 1/1999 |
| EP | 0907266 | 4/1999 |
| EP | 0920153 | 6/1999 |

OTHER PUBLICATIONS

Al-Salameh et. al., *Optical Networking*, Bell Labs Technical Journal, vol. 3, No. 1, Jan.-Mar. 1998, pp. 39-61.

* cited by examiner

*Primary Examiner*—Agustin Bello
(74) *Attorney, Agent, or Firm*—Bell, Boyd & Lloyd LLP

(57) ABSTRACT

The present invention relates to a network node that includes optical add/drop modules such that a module can be exchanged without disruption of the connections.

6 Claims, 3 Drawing Sheets

NETWORK NODES WITH OPTICAL ADD/DROP MODULES

BACKGROUND OF THE INVENTION

1. Field of the Invention

The invention generally relates to a network node. More specifically, the present invention relates to a network node with optical add/drop modules.

2. Description of the Prior Art

A network node for use in a ring network is generally disclosed in German Patent Document No. DE 19731494 C4. The ring network provided for transmitting data in the wavelength division multiplex method has a working device, a protection device and a number of network nodes with add/drop modules. The distinctive feature of this known ring network, the transmission capacity of which is to be utilized to an optimum extent, consists in using only a single protection channel which can be accessed by all terminals, i.e., being able to send data and to receive data.

As disclosed in European Patent Document No. EP 0 847 158 A2, a network node with optical add/drop modules for bidirectional networks is also known in which a separate module OADM1 and OADM2, respectively, is provided for each of the two directions of transmission, in which in each case an add function and a drop function is combined for the respective direction of transmission. The known arrangement is neither provided for a ring network nor does it contain a protection device.

As disclosed in European Patent Document No. EP 0 892 524 A2, a network node with optical add/drop modules in a unidirectional ring network that has a number of ring lines is also known. In the case of a "single point of failure" in the network, the signals are diverted via other links of another ring line which are not faulty.

It is also known as disclosed in European Patent Document No. EP 0 729 247 A2 to guarantee the transmission capacity in bidirectional ring networks, for example in the case of a disturbance, by transmitting on each fiberglass waveguide, in addition to the operating signal, a replacement signal of different wavelength. In the case of a disturbance, i.e., in the case of an interruption of the connection between two network elements, the operating signal between the network elements of the ring network affected by the failure of the connection is switched to the replacement signal, and thus to the second wavelength, thereby maintaining the full transmission capacity. The network elements provided are add/drop multiplexers which are arranged in parallel with existing optical interfaces at in each case additional optical interfaces. These additional interfaces operate in a different wavelength range in contrast to the existing optical interfaces. Operating signal and replacement signal of an optical transmitter are combined in a suitable manner by optical multiplexers at the output of each network element and transmitted to the receiving site by the respective optical fiber waveguides. At the receiving site, an optical demultiplexer separates the two optical signals of different wavelengths and supplies them to the further processing stages.

In purely optical wavelength division multiplex networks, some of the optical connections will be purely of a static nature but some others will have short lifetimes. To optimally utilize the network capacities, there exists a need for automatically reconfigurable and purely optical add/drop multiplexers. In this regard, the reconstruction of existing systems may necessarily need to take place with continuing traffic, i.e., careful protection of the continuing traffic without optical "single point of failure" is necessarily required.

In addition, the ability to implement not only traffic links via a central hub-type network node but any point-to-point connections may necessarily be needed. A typical traffic pattern in future two-fiber ring networks will necessarily include a forward return connection in different fibers on the same link. In this regard, the corresponding protection connection leads via a different route in two fibers, thus providing for a reliable standby connection in the case of a fiber break.

Due to the minimization of production costs in metropolitan ring networks, great differences in level must be expected in the individual wavelength channels.

In this regard, the static add/drop multiplexers in purely optical wavelengths division multiplex rings will necessarily need to be expanded into dynamically remotely and configurable add/drop multiplexers, thus an "in-service" expansion should be possible.

Static optical add/drop multiplexer network elements have only been on the market for a very short time (CAMBRIAN, CIENA, OSICOM, LUCENT, SIEMENS 04/99), where commercial remotely configurable systems are expected for the year 2000. The remote configurability of optical add/drop multiplexer modules has currently only been implemented by way of expensive optical circuit technology (i.e., wavelengths division multiplexers, demultiplexers and space division switching matrices).

However, no corresponding arrangements for setting up remotely configurable protected 1+1 connections have been reported although the use of fiber gratings in add/drop modules is described in U.S. Pat. No. 5,748,349.

An object of the present invention, therefore, relates to protecting the transmission of a WDM signal from an interruption of the line when, for example, modules are exchanged in a ring network.

SUMMARY OF THE INVENTION

Accordingly, the present invention is directed to a network node with optical add modules and drop modules which can provide an uninterrupted transmission of a signal between any two network nodes when a necessary change of one of the two modules in the ring network is made.

The circuit arrangement of the purely optical add/drop module of the present invention provides for modular expansion of static add/drop multiplexers in wavelengths division multiplex rings to form dynamically remotely configurable add/drop multiplexers. In this arrangement, a heterodyne crosstalk of <50 dB can be achieved.

In contrast to the conventional arrangement of the components in add/drop multiplexers based on fiber gratings, circulators and/or 1:2 couplers on one board, the drop (i.e., circulator and grating) and add (i.e., 1:2 coupler) functions of the present invention are distributed over two separate boards.

As a result, bidirectional two-fiber traffic can be implemented without any "single point of failure", e.g., electrical and/or optical 1+1 protection is fully supported. In this regard, the module can also be used for protected unidirectional traffic by external plugging. Due to the distributed add/drop functionality on two boards (or groups of boards), a board (group of boards) can be exchanged after complete protection switching without interrupting the connection.

Due to the modularity (e.g., group of four tunable gratings) and the protection characteristics of the circuit arrangement of the present invention, continuous expansion of existing static add/drop multiplexers to "in-service" conversion associated with dynamic traffic patterns can be provided.

The module of the present invention can support a large number of channels (up to 128) and/or great differences in the individual channel levels.

An important aspect of the present invention relates to the circuit arrangement that can protect the optical path against a "single point of failure", i.e., the separate arrangement of add and drop functions on two boards. For example, the present invention can include a circulator and tunable gratings for the drop process in addition to a 1:2 coupler for inserting new channels.

An additional dielectric filter, for example, as disclosed in U.S. Pat. No. 5,748,349 can be used for splitting the wavelengths and for increasing the heterodyne crosstalk to less than 55 dB.

Additional features and advantages of the present invention are described in, and will be apparent from, the Detailed Description of the Preferred Embodiment and the Drawings.

DETAILED DESCRIPTION OF THE PREFERRED EMBODIMENT

Figure 1:
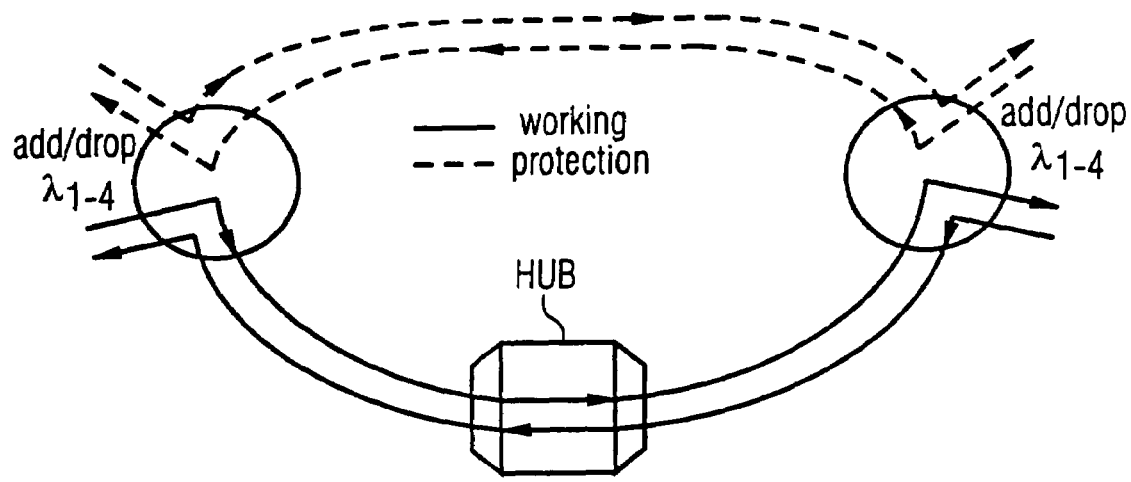
FIG. 1 diagrammatically shows a bidirectional ring network according to the prior art.
Figure 2:
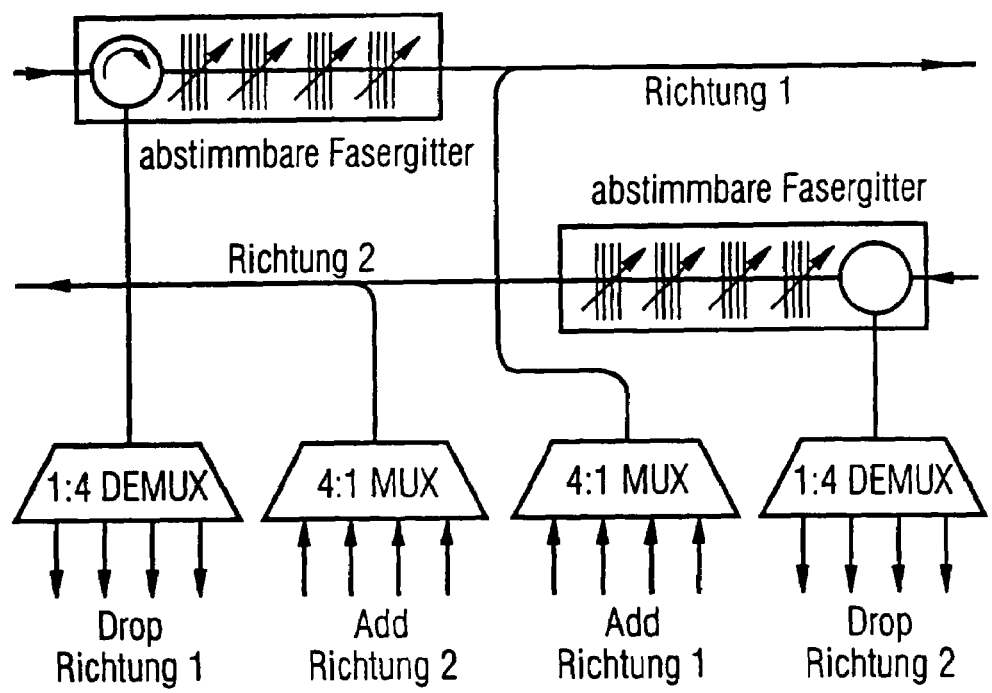
FIG. 2 diagrammatically shows an embodiment of a remotely configurable optical add/drop multiplexer for bidirectional traffic of the present invention.
Figure 3:
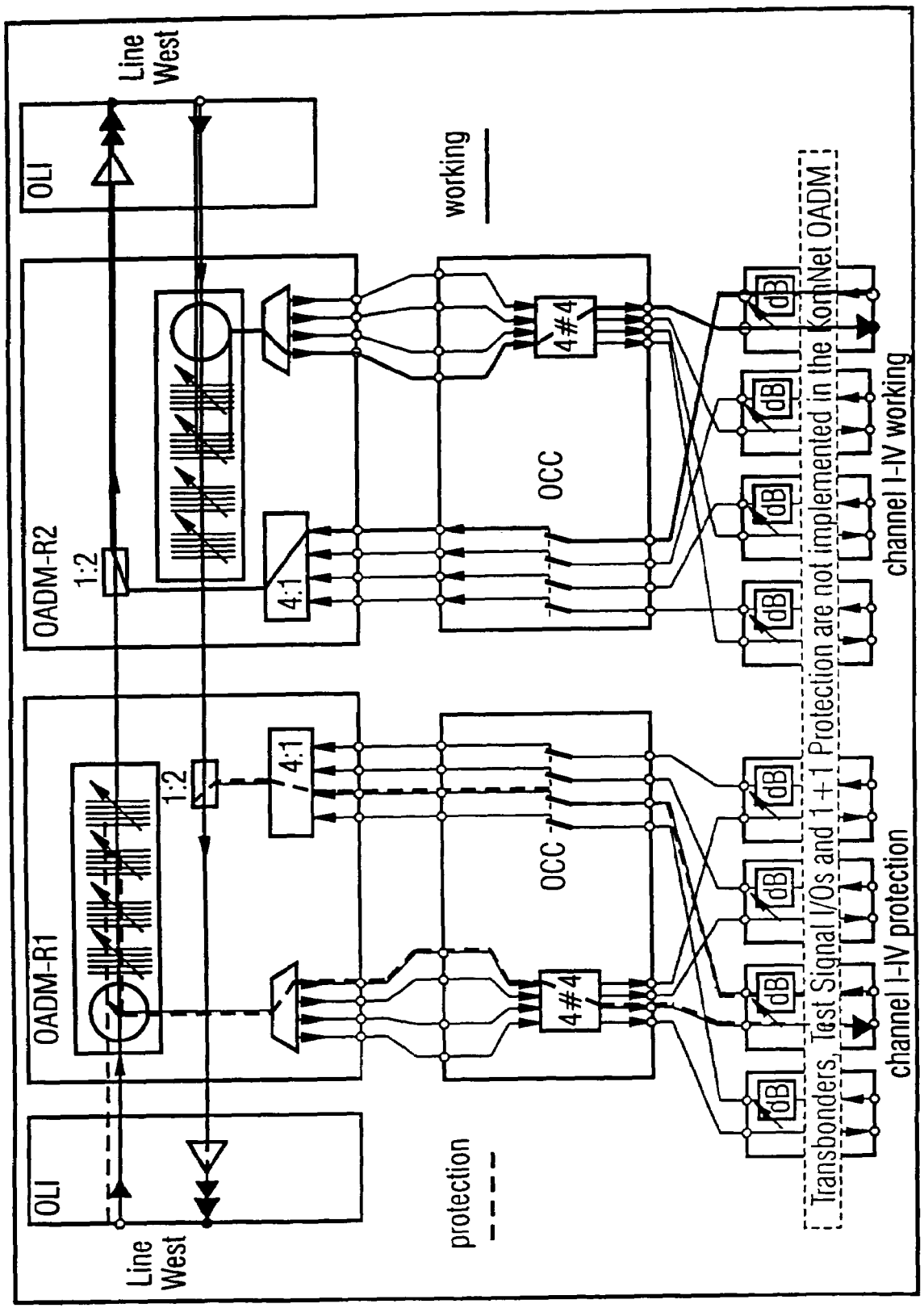
FIG. 3 diagrammatically shows another embodiment of a remotely configurable optical add/drop multiplexer for bidirectional traffic of the present invention.

In an embodiment, the configuration of a remotely configurable optical add/drop multiplexer for bidirectional traffic of the present invention is shown in FIG. 2. As previously discussed, FIG. 1 shows a bidirectional ring network according to the prior art. FIG. 3 shows another example of the optical add/drop multiplexer for bidirectional traffic of the present invention.

In an embodiment, a drop wavelength of each of the four gratings (filters) can be tuned by piezoelectric adjusting elements (such as, 200 GHz max. or HIGHWAVE). This makes it possible to flexibly drive two wavelength channels with one grating (crosstalk <30 dB). The wavelength filters can be typically constructed of dielectric layers to enhance heterodyne crosstalk (i.e., <25 dB crosstalk). The 4:1 coupler can be replaced by a wavelength filter.

To achieve a maximum of flexibility for future developments, the add/drop function can be separated from the routing function of the optical cross connect card (OCC). It should be appreciated that the OCC card is optional.

As previously discussed, FIG. 3 shows a working and protection path for reconfigurable OADM. In this regard, it should be appreciated that an important aspect of the present invention is the OADM-R board(s) as shown in FIG. 3.

For example, the circuit arrangement of the optical components on the two OADM-R boards and the resultant logical separation of the add/drop functions. By separating the drop function (circulator and four gratings in this case) and the add function (1:2 coupler) on two different boards, any "single point of failure" can be prevented in the case of 1:1 protection. It should be appreciated that this logical separation is not provided when a second circulator is used.

Combining two OADM-R boards (board means module; or on two groups of boards instead of on two boards) also provides for an evolution from rigid to dynamically reconfigurable traffic relationships as compared to existing systems which usually use groups of four wavelengths that can be supplemented by one "dynamic group" during continued operation.

Further, the present invention can include an additional wavelength filter. The additional wavelength filter can result in a suppression of the heterodyne crosstalk by over 55 dB. This value can enable modules to be used in systems with 128 channels and/or with great differences in the individual channel levels.

It should be appreciated that Applicants believe that commercially available add/drop modules do not provide for "in-service" expansion and further require group prefilters to be used in order to achieve cost-reducing modularity. To achieve a protected connection, commercially available modules must necessarily include two 2×2 switches for each wavelength.

Figure 4:
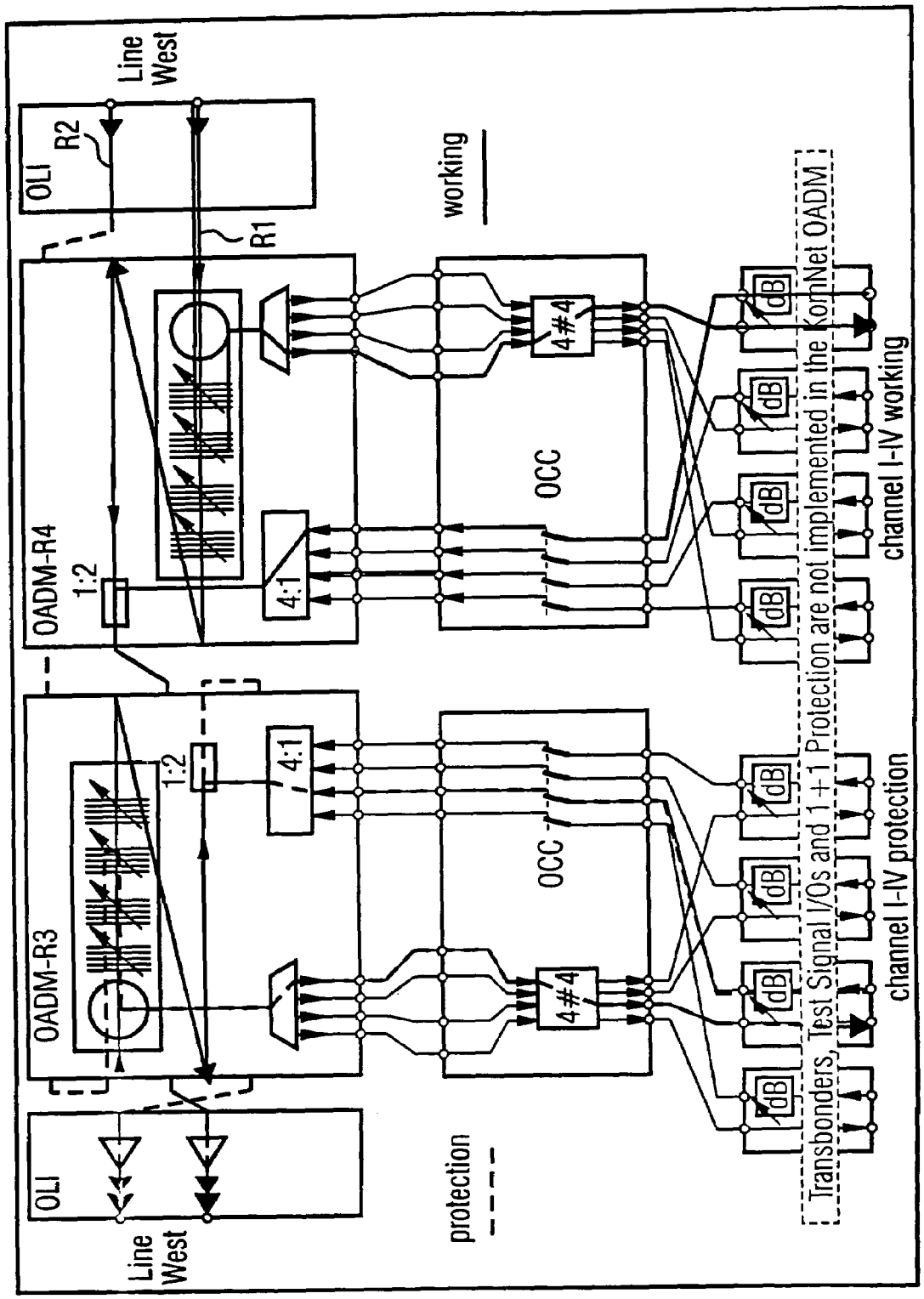
FIG. 4 diagrammatically shows an embodiment of a remotely configurable optical add/drop multiplexer for unidirectional traffic of the present invention.

As shown in FIG. 4, the OADM-R module can also be used in unidirectional two-fiber ring networks. It should be appreciated that this does not require any change in the hardware configuration where the required changes can be implemented by external plug-in fiber connections for use in unidirectional two-fiber ring networks.

It should be understood that various changes and modifications to the presently preferred embodiments described herein will be apparent to those skilled in the art. Such changes and modifications can be made without departing from the spirit and scope of the present invention and without diminishing its attended advantages. It is therefore intended that such changes and modifications be covered by the hereafter appended claims.

The invention claimed is:

1. A network node having optical add modules and drop modules for inserting and dropping channels in a bidirectional ring network that has a working connection and a protection connection to other network nodes, comprising:

a first drop module and a first add module positioned on a protection module for bidirectional protection connection arranged on a first board; and a second drop module and a second add module positioned on a working module arranged on a second board for bidirectional working connection, wherein the second drop module and the first add module are positioned directly in series without intervening components with respect to a second fiber ring, and wherein the first drop module and the second add module are positioned directly in series without intervening components with respect to a first fiber ring.

2. The network node as claimed in claim 1, wherein the first drop module and the first add module of the protection module and the second drop module and the second add module of the working module each have a line input and a line output such that the first drop module and the first add module and the second drop module and the second add module are each separately insertable in the first or second fiber ring.

3. A network node having optical add modules and drop modules for inserting and dropping channels in a unidirectional ring network which has a working connection and a protection connection to other network nodes, comprising:
- a first drop module and a first add module positioned on a protection module arranged on a first board for protection connection; and
- a second drop module and a second add module positioned on a working module arranged on a second board for working connection, wherein the first drop module and the first add module are inserted directly in series without intervening components in a second fiber ring, the second drop module and the second add module are inserted directly in series without intervening components in a first fiber ring.

4. The network node as claimed in claim 3, wherein the first drop module and the first add module of the protection module and the second drop module and the second add module of the working module each have a line input and a line output such that the first drop module and the first add module and the second drop module and the second add module are each separately insertable in the first or second fiber ring.

5. A network node having optical add modules and drop modules for inserting and dropping channels in a bidirectional as well as a unidirectional ring network, which has a working connection and a protection connection to other network nodes, comprising:
- a first drop module and a first add module positioned on a protection module arranged on a first board for protection connection; and
- a second drop module and a second add module positioned on a working module arranged on a second board for working connection, wherein the first drop module and the first add module of the protection module and the second drop module and the second add modules of the working module each have a line input and a line output, such that the first drop module and the first add module and the second drop module and the second add module are insertable in a first or a second fiber ring, wherein at least one add module and one drop module are removable without interrupting signal transmission between network nodes, and at least one add module and at least one drop module on different boards are connected directly in series without intervening components.

6. The network node as claimed in claim 5, inserted in a unidirectional ring network, wherein the first drop module and the first add module are inserted in series in the second fiber ring, the second drop module and the second add module are inserted in series in the first fiber ring.

* * * * *